(12) United States Patent
Yasuda et al.

(10) Patent No.: US 7,392,271 B2
(45) Date of Patent: Jun. 24, 2008

(54) RANDOM NUMBER GENERATING CIRCUIT, SEMICONDUCTOR INTEGRATED CIRCUIT, IC CARD AND INFORMATION TERMINAL DEVICE

(75) Inventors: Shinichi Yasuda, Kanagawa-ken (JP); Shinobu Fujita, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 670 days.

(21) Appl. No.: 10/919,291

(22) Filed: Aug. 17, 2004

(65) Prior Publication Data
US 2005/0108308 A1   May 19, 2005

(30) Foreign Application Priority Data
Sep. 30, 2003   (JP) .............. 2003-341983

(51) Int. Cl.
G06F 1/02   (2006.01)
(52) U.S. Cl. ..................................... 708/250
(58) Field of Classification Search ......... 708/250–256
See application file for complete search history.

(56) References Cited

U.S. PATENT DOCUMENTS

| | | | | |
|---|---|---|---|---|
| 3,790,768 A | * | 2/1974 | Chevalier et al. | 708/251 |
| 4,928,310 A | * | 5/1990 | Goutzoulis et al. | 708/256 |
| 4,998,263 A | * | 3/1991 | Kendall et al. | 708/250 |
| 6,163,874 A | * | 12/2000 | Bron | 716/4 |
| 6,571,263 B1 | * | 5/2003 | Nagai | 708/255 |
| 6,862,605 B2 | * | 3/2005 | Wilber | 708/255 |
| 7,149,764 B2 | * | 12/2006 | Henry et al. | 708/250 |
| 2002/0124033 A1 | * | 9/2002 | Takahashi | 708/250 |

FOREIGN PATENT DOCUMENTS

| | | |
|---|---|---|
| JP | 60-102015 | 6/1985 |
| JP | 6-310996 | 11/1994 |
| JP | 2001-196540 | 7/2001 |
| JP | 2001-290634 | 10/2001 |

\* cited by examiner

*Primary Examiner*—Chat C Do
(74) *Attorney, Agent, or Firm*—Oblon, Spivak, McClelland, Maier & Neustadt, P.C.

(57) ABSTRACT

A random number generating circuit receives as input a first digital random number signal generated at a first generating rate and produces as output a second digital random number signal having a second generating rate that is twice as high as the first generating rate. A semiconductor integrated circuit, an IC card and an information terminal device comprising the random number circuit is provided.

16 Claims, 14 Drawing Sheets

```
IF X1 = X2,
        EQUIVALENT TO FLIP-FLOP (EVEN NUMBER OF INVERTERS)
        FOR Z = 1
                IF X1 = X2 = 1 THEN Q1 = 0, Q2 = 0
                IF X1 = X2 = 0 THEN Q1 = 1, Q2 = 0
        FOR Z = 0
                IF X1 = X2 = 1 THEN Q1 = 1, Q2 = 1
                IF X1 = X2 = 0 THEN Q1 = 0, Q2 = 1

IF X1 ≠ X2,
        EQUIVALENT TO RING OSCILLATOR
```

RANDOM NUMBER GENERATING CIRCUIT, SEMICONDUCTOR INTEGRATED CIRCUIT, IC CARD AND INFORMATION TERMINAL DEVICE

CROSS-REFERENCE TO RELATED APPLICATIONS

This application is based upon and claims the benefit of priority from the prior Japanese Patent Application No. 2003-341983, filed on Sep. 30, 2003; the entire contents of which are incorporated herein by reference.

BACKGROUND OF THE INVENTION

The invention relates to a random number generating circuit, semiconductor integrated circuit, IC card and information terminal device. In particular, the invention relates to a random number generating circuit, semiconductor integrated circuit, IC card and information terminal device capable of generating high-quality digital random number signals at high rates.

In recent years, sophisticated physical random numbers have been increasingly needed in information security, simulation and other areas. In particular, from the viewpoint of ensuring security in mobile devices such as IC cards and cellular phones, a small-size random number circuit is required which can generate high-quality random numbers at high rates. However, in physical random number generators, there has often been a tradeoff between the rate of generating random numbers and their quality. It has been a problem that the generating rate is forced to be lowered to ensure a sufficient quality of random numbers with a small-size physical random number circuit.

A solution to the problem is, for example, to provide a plurality of random number circuits, each outputting 1-bit physical random numbers. The plurality of outputs are sequentially read out, thereby being regarded as a 1-bit random number sequence. However, this solution has problems that it is difficult to provide a plurality of physical random number circuits having similar characteristics, and that the circuit scale increases.

Another solution is to store data in a memory and rapidly read it out when needed. However, this solution has problems that the frequency of using random numbers is limited in order to ensure sufficient time for storing the random number data. To avoid this problem, a stored random number sequence is operated with a slowly generated random number sequence to form a new random number sequence which is stored back in the memory (Japanese Laid-Open Patent Application (Kokai) 2001-290634). While this solution overcomes the problem of the generating rate, it has a problem that the random numbers exhibit periodicity because the information of the same random numbers is repeatedly used.

As described above, in the conventional art, it is not easy to generate high-quality random numbers at high rates with a small-scale circuit.

SUMMARY OF THE INVENTION

The invention provides a random number generating circuit in which random numbers with a higher generating rate can be obtained from the random number generating circuit which outputs 1-bit physical random numbers without using a plurality of random number circuits. A feature of the random number generating circuit is that a digital waveform representing a certain physical random number sequence is transformed into a digital waveform representing a faster, in particular, twofold faster random number sequence by utilizing the original random number sequence. The generating rate can be further increased by repeating the twofold speedup.

More specifically, according to an aspect of the invention, there is provided a random number generating circuit that receives as input a first digital random number signal having a first generating rate and produces as output a second digital random number signal having a second generating rate that is twice as high as the first generating rate.

According to another aspect of the invention, there is provided a semiconductor integrated circuit comprising a random number generating circuit that receives as input a first digital random number signal generated at a first generating rate and produces as output a second digital random number signal having a second generating rate that is twice as high as the first generating rate.

According to another aspect of the invention, there is provided an IC card comprising a semiconductor integrated circuit having a random number generating circuit that receives as input a first digital random number signal generated at a first generating rate and produces as output a second digital random number signal having a second generating rate that is twice as high as the first generating rate.

According to another aspect of the invention, there is provided an information terminal device comprising a semiconductor integrated circuit having a random number generating circuit that receives as input a first digital random number signal generated at a first generating rate and produces as output a second digital random number signal having a second generating rate that is twice as high as the first generating rate.

BRIEF DESCRIPTION OF THE DRAWINGS

The present invention will be understood more fully from the detailed description given herebelow and from the accompanying drawings of the embodiments of the invention. However, the drawings are not intended to imply limitation of the invention to a specific embodiment, but are for explanation and understanding only.

In the drawings.

DETAILED DESCRIPTION

Embodiments of the invention will now be described in detail with reference to the drawings.

Figure 1:
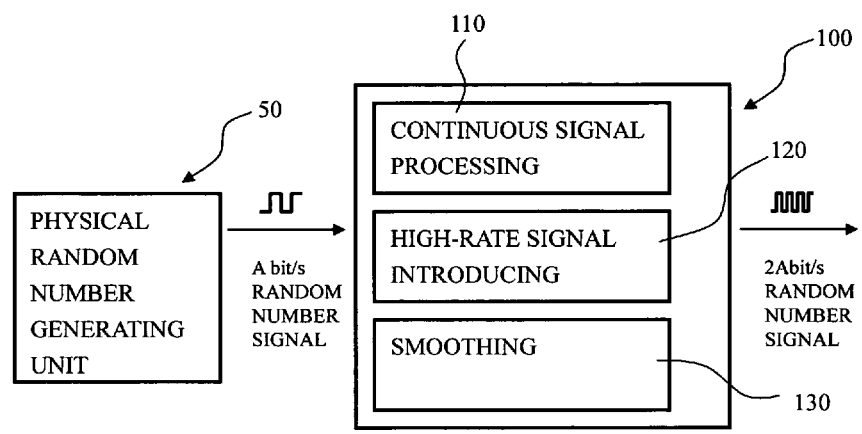
FIG. 1 is a block diagram of a random number generating circuit according to an embodiment of the invention.

FIG. 1 is a block diagram of a random number generating circuit according to an embodiment of the invention.

More specifically, the random number generating circuit 100 according to the invention comprises a continuous signal processing unit 110, a high-rate signal introducing unit 120 and a smoothing unit 130. The random number generating circuit 100 serves to transform random number data generated by the physical random number generating unit 50. The physical random number generating unit 50 may or may not be included as part of the random number generating circuit 100.

A feature of the random number generating circuit 100 according the present embodiment is that a digital waveform representing a certain random number sequence is transformed into a digital waveform having a twofold higher generating rate. More specifically, as illustrated in the figure, a digital random number signal of A bits per second (bits/s) generated by the physical random number generating unit 50 is transformed into a random number signal of 2A bits per second by the random number generating circuit 100. Furthermore, according to the invention, the signal sequence remains to be a random number sequence even if the generating rate of the random number signal is doubled, that is, the rate of reading out the digital value is doubled. In other words, when the High and Low levels of the digital signal are depicted with respect to time, the operation performed by the random number generating circuit 100 according to the present embodiment is viewed as generating a digital signal in which one piece of signal varies in half duration as compared to the signal before transformation.

To achieve such transformation of digital random numbers, the random number generating circuit 100 according to the invention comprises a continuous signal processing unit 110, a high-rate signal introducing unit 120 and a smoothing unit 130.

The continuous signal processing unit 110 serves to divide a long run of "0" or "1" signals. This can avoid disruption of the balance between "0s" and "1s" as random numbers when the frequency of the long run of signals is doubled. For example, when the quality of random numbers is desired to pass the test of FIPS 140-2 (Federal Information Processing Standards Publication: FIPS PUB 140-2 (2001)), even a run of 20 identical digits passes the test, but its double, i.e., a run of 40 digits fails the test. The continuous signal processing unit 110 is provided to avoid this situation. While the above-mentioned specific example is based on FIPS 140-2, the acceptable run length can be appropriately determined according to practical use conditions.

The high-rate signal introducing unit 120 serves to introduce a signal component having one half of a clock width. In other words, the generating rate of the digital random number signals can be doubled by introducing a component with a signal width being one half in the high-rate signal introducing unit 120.

The smoothing unit 130 serves to perform smoothing by adjusting the balance between "0s" and "1s" as a random number sequence. More specifically, the smoothing unit 130 corrects the "deviation" of balance between "0s" and "1s" due to the deformation by the continuous signal processing unit 110 and the high-rate signal introducing unit 120, thereby serving to adjust the balance between "0s" and "1s" as a random number sequence. In the sense of adjusting balance, the smoothing unit 130 plays a role close to that of the continuous signal processing unit 110.

The deformation of digital signals by the continuous signal processing unit 110, high-rate signal introducing unit 120 and smoothing unit 130 maybe performed separately. Alternatively, some or all of the deformations may be performed simultaneously, or in a different order.

Next, a specific example of the configuration of the random number generating circuit for achieving speedup according to the present embodiment will be described.

Figure 2:
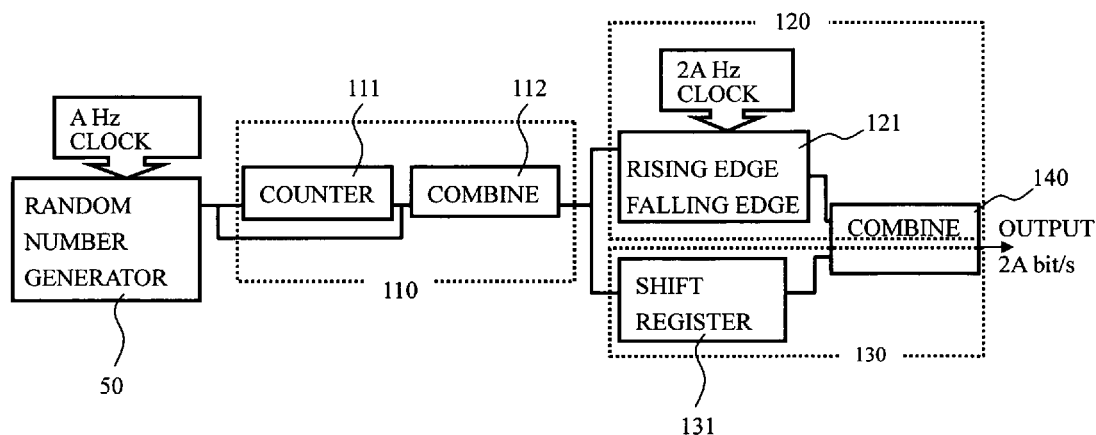
FIG. 2 is a schematic diagram showing a first specific example of the random number generating circuit according to the invention.

FIG. 2 is a schematic diagram showing a first specific example of the random number generating circuit according to the invention. In the figure, the elements similar to those described with reference to FIG. 1 are labeled with like reference numerals and will not be described in detail. First, a clock having a frequency of A hertz (Hz) is inputted to the random number generator 50, which produces a digital random number signal of A bits per second. This random number signal is first inputted to the continuous signal processing unit 110.

The continuous signal processing unit 110 comprises a counter 111 and a combiner 112. The counter 111 is used to count how many times the same digit continues to repeat in the inputted digital random number signal. When the number of continued repetitions is more than or equal to a certain threshold, the combiner 112 combines the original random number with its inverse value. The digital random number signal to which the continuous signal processing has been applied is inputted separately to the high-rate signal introducing unit 120 and the smoothing unit 130.

Figure 3:
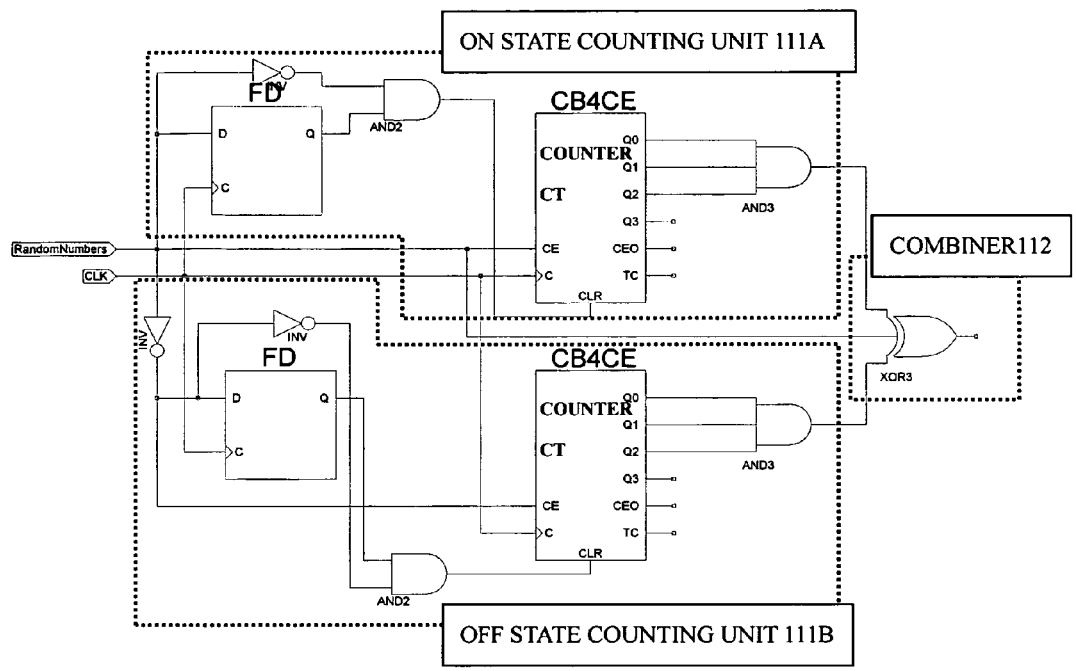
FIG. 3 is a schematic diagram showing a specific example of the counter 111 and combiner 112.

FIG. 3 is a schematic diagram showing a specific example of the counter 111 and combiner 112.

More specifically, the counter 111 comprises an ON state counting unit 111A and an OFF state counting unit 111B. The ON state counting unit 111A and the OFF state counting unit 111B are connected such that the clock enable terminal CE is High when the random number output is ON and OFF, respectively. When the clock enable terminal CE is High, each counter CT starts counting. The circuit that precedes the counter CT and comprises a D-flip-flop, inverter(s) and AND gate is a falling edge detector, which outputs a signal for one clock to reset the counter when the random number output changes from ON to OFF and from OFF to ON, respectively. This example is configured such that a signal is outputted when the same value continues for eight clocks in the random number output. The combiner 112 achieves combining by making an exclusive-OR among the outputs of the respective counters 111A, 111B and the original random number.

It should be noted that the signal processing in the continuous signal processing unit 110 is not limited to those achieved by the counter 111. For example, as described later in detail, a method may be used which synthesizes a pulse signal that produces a High level at a fixed interval.

Returning to FIG. 2, the high-rate signal introducing unit 120 comprises an edge detecting unit 121 and a combiner 140. The edge detecting unit 121 detects a rising and falling edge of the inputted signal by using a clock CL2 having a frequency of twice as high as the frequency A of a clock CL1 that has generated the original random number. Introducing high-rate components is based on the detected edges.

Figure 4:
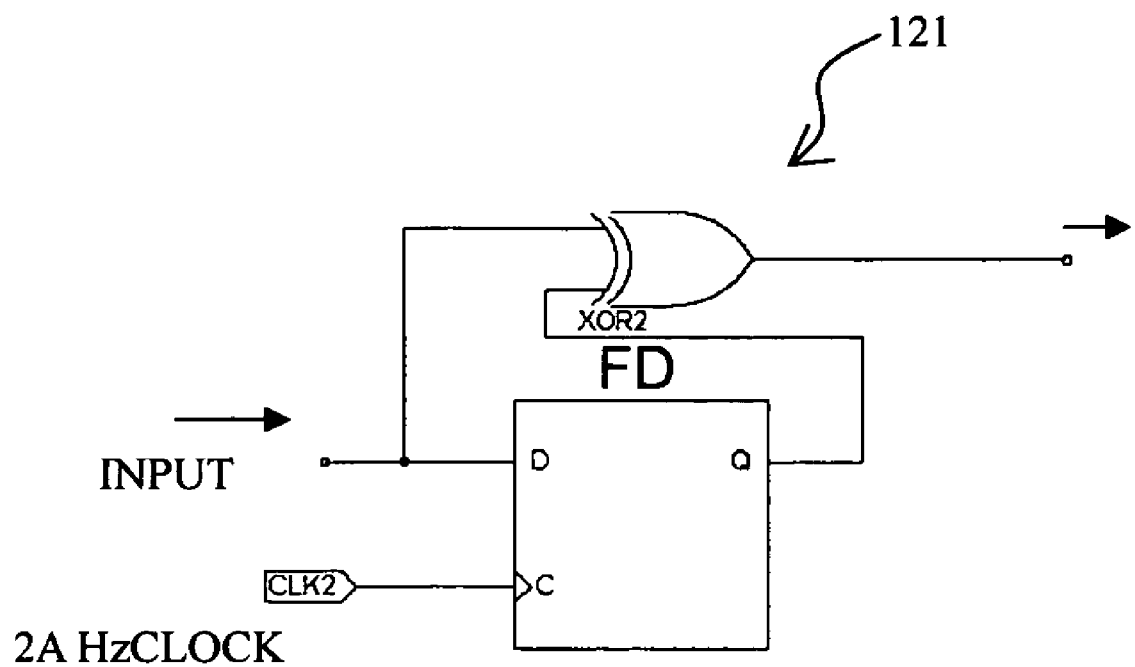
FIG. 4 is a schematic diagram showing a specific example of the edge detector 121.

FIG. 4 is a schematic diagram showing a specific example of the edge detector 121. More specifically, the edge detector 121 may comprise, for example, a flip-flop and an exclusive-OR circuit.

On the other hand, the smoothing unit 130 shown in FIG. 2 comprises a shift register 131, and shares the combiner 140 with the high-rate signal introducing unit 120.

Figure 5:
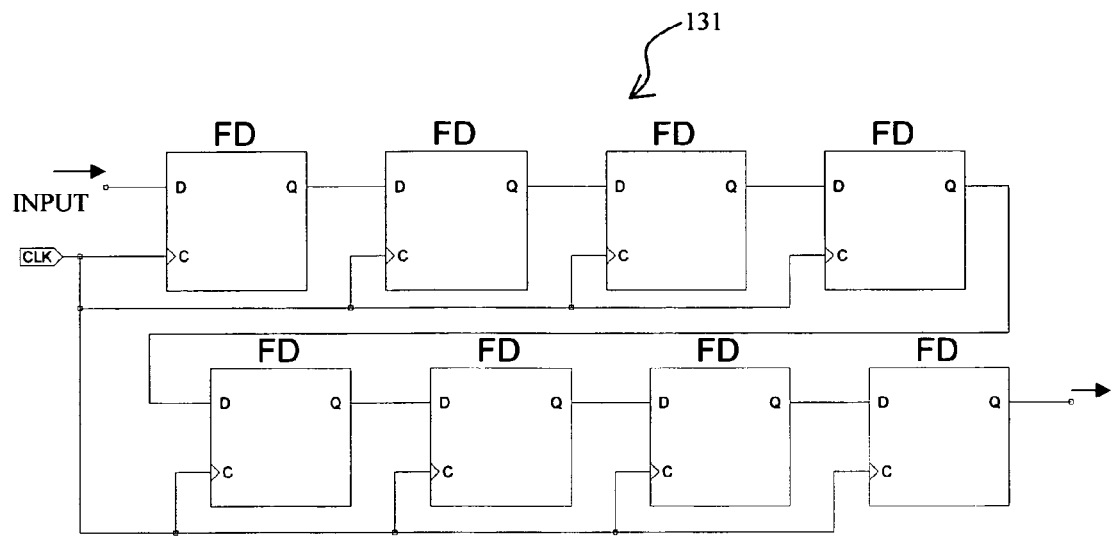
FIG. 5 is a schematic diagram showing a specific example of the shift register 131.

FIG. 5 is a schematic diagram showing a specific example of the shift register 131. More specifically, the shift register 131 can be configured by aligning a plurality of flip-flops FD. The shift register 131 can be used to shift its waveform by several clocks for smoothing. The simplest way to perform smoothing is to make an exclusive-OR with another random number sequence. In a 1-bit random number source, one cannot obtain another random number sequence by nature. However, it can be used for smoothing by utilizing the property that the random numbers have no autocorrelation and effectively regarding the shifted version of the random number sequence as another random number sequence. An edge signal outputted from the edge detecting unit 121 and the signal shifted in the shift register 131 are inputted to the combiner 140, and an exclusive-OR between them is obtained. As a result, a digital random number signal can be obtained which is outputted at a bit rate twice as high as that of the original random number sequence.

Figure 6:
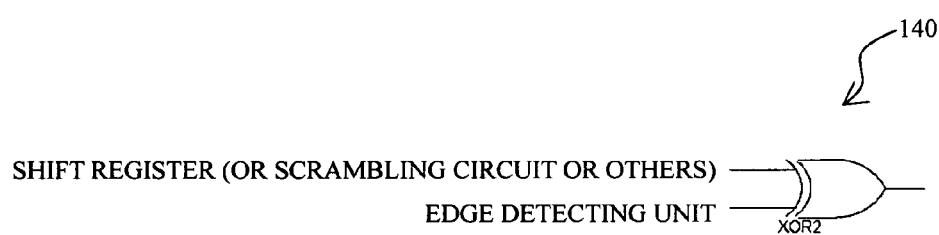
FIG. 6 is a schematic diagram showing a specific example of the combiner 140.

FIG. 6 is a schematic diagram showing a specific example of the combiner 140. More specifically, the outputs from the shift register 131 (or scrambling circuit or other circuits described later) and from the edge detector 121 can be combined by using an exclusive-OR circuit.

In this specific example again, the continuous signal processing unit 110, high-rate signal introducing unit 120 and smoothing unit 130 can be arranged in a different order as described above with reference to FIG. 1.

Figure 7:
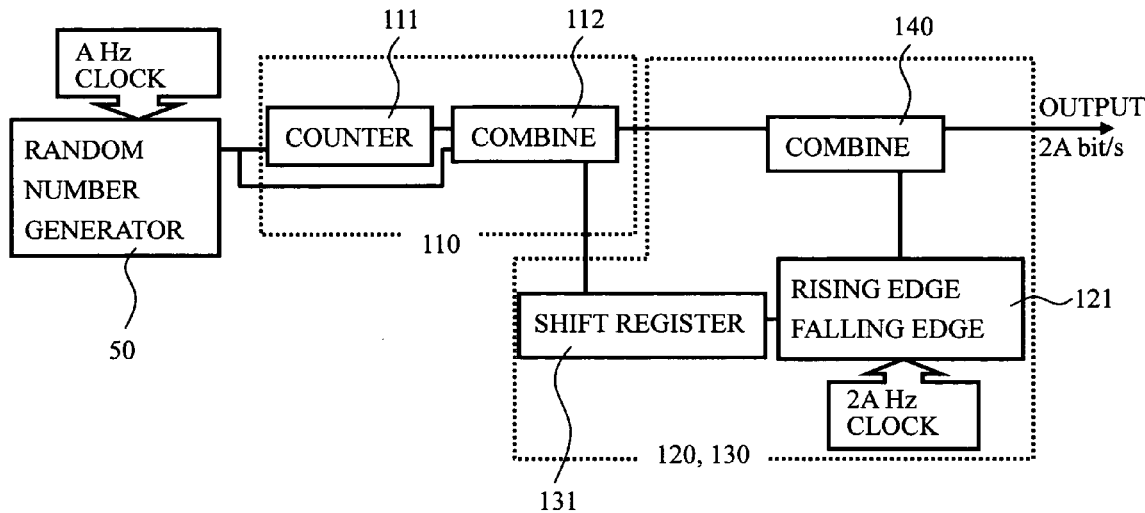
FIG. 7 is a block diagram showing a specific example in which the high-rate signal introducing unit 120 and the smoothing unit 130 are integrated together.

FIG. 7 is a block diagram showing a specific example in which the high-rate signal introducing unit 120 and the smoothing unit 130 are integrated together. More specifically, if the random numbers have no autocorrelation, a random number sequence and its shifted version can be viewed as effectively different random number sequences. As a result, provided that an exclusive-OR is finally taken in the combiner 140, introducing a component having a frequency of 2 A hertz (Hz) into the signal before shifting is equivalent to introducing the component having a frequency of 2 A hertz (Hz) into the shifted signal. For the same reason, smoothing may be performed first in the smoothing unit 130, and then the processing may be continued by the continuous signal processing unit 110 and the high-rate signal introducing unit 120.

Furthermore, also in this specific example, the signal processing in the continuous signal processing unit 110 is not limited to those achieved by the counter 111. A method may be used which synthesizes a pulse signal that produces a High level at a fixed interval.

Figure 8:
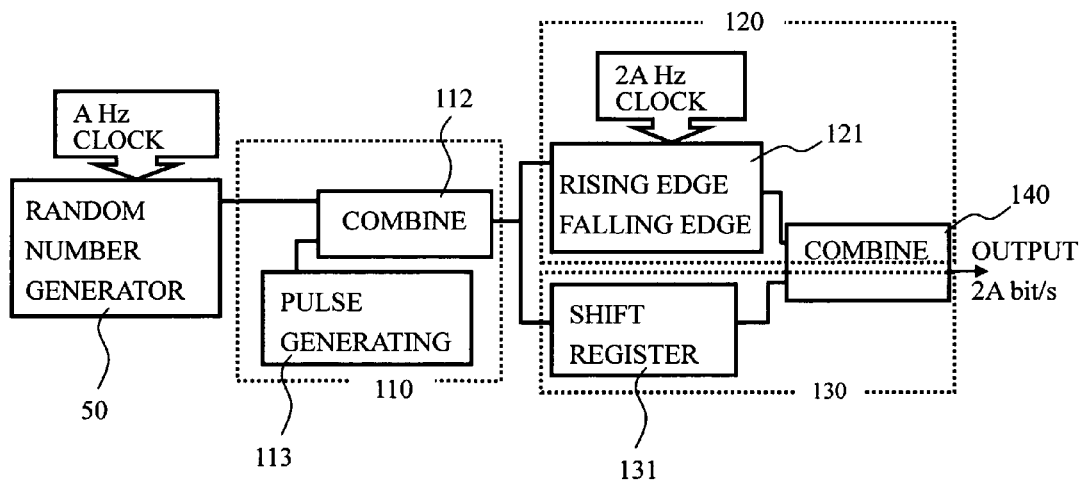
FIG. 8 is a block diagram showing a random number generating circuit comprising a continuous signal processing unit 110 using a pulse generator 113.

FIG. 8 is a block diagram showing a random number generating circuit comprising a continuous signal processing unit 110 using a pulse generator 113. More specifically, a continuous digital random number signal can be divided by using a signal having an appropriate pulse interval outputted from the pulse generator 113. In this method, when the high-rate random number generating circuit 100 according to the invention is repeatedly used to introduce a periodic signal, the quality of the random number sequence may be degraded, while there is an advantage that the circuit scale can be reduced as compared to that using the counter 111. One can make meaningful use of the configuration of this specific example by determining an acceptable degree of degradation according to practical use conditions.

Figure 9:
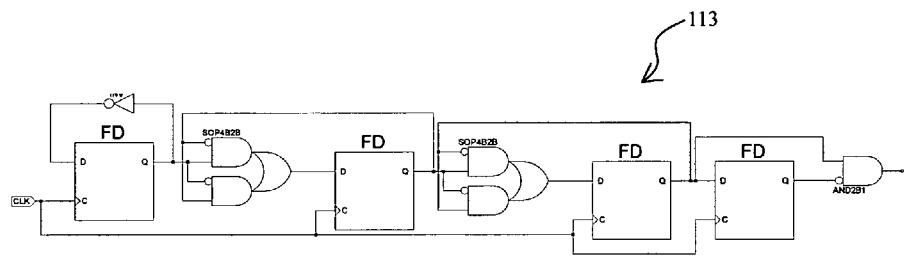
FIG. 9 is a schematic diagram showing a specific example of the pulse generator 113.

FIG. 9 is a schematic diagram showing a specific example of the pulse generator 113. More specifically, the pulse generator 113 can be configured by appropriately combining, for example, flip-flops FD, inverters and other logic circuits.

On the other hand, the smoothing unit 130 is not also necessarily limited to the configuration using the shift register 131. For example, it may use such transformations as those performed at the beginning of the DES (data encryption standard) encryption algorithm in which a set of continuous signals are combined and rearranged.

Furthermore, when the smoothing is performed using the output of the shift register 131, the output can be randomly selected to enhance the quality of high-rate random numbers.

Figure 10:
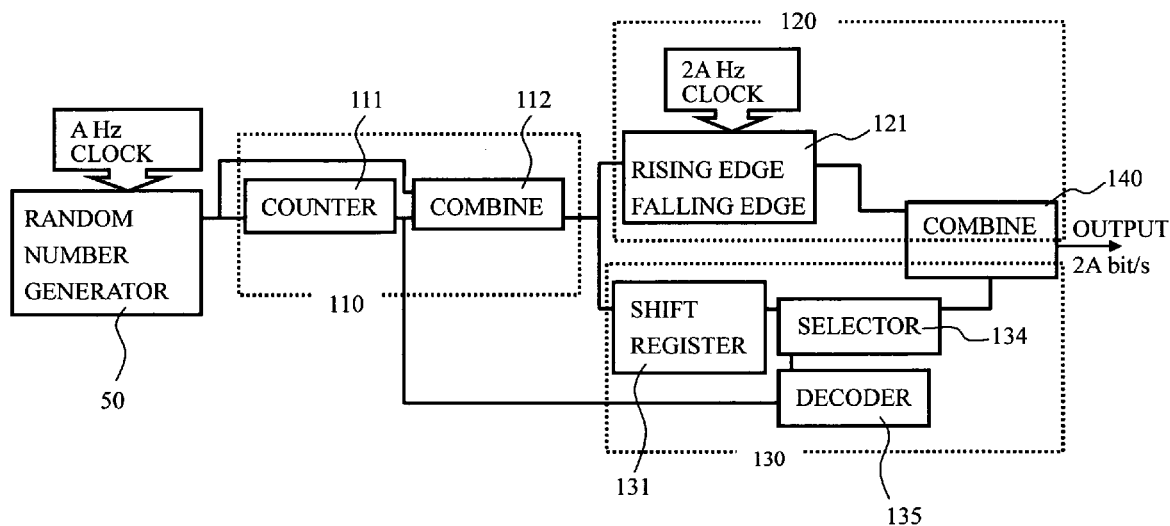
FIG. 10 is a schematic diagram showing a configuration in which a counter value used in the continuous signal processing unit 110 is reused.

FIG. 10 is a schematic diagram showing a configuration in which a counter value used in the continuous signal processing unit 110 is reused. The counter 111 counts the length of ON states (or OFF states) for the random numbers outputted from the random number generator 50, and thus produces a random output. The value of the output can be decoded with the decoder 135 and the number of shifts in the shift register 131 can be selected by the selector 134. Accordingly, the number of shifts for the shift register used in the smoothing can be set randomly.

Figure 11:
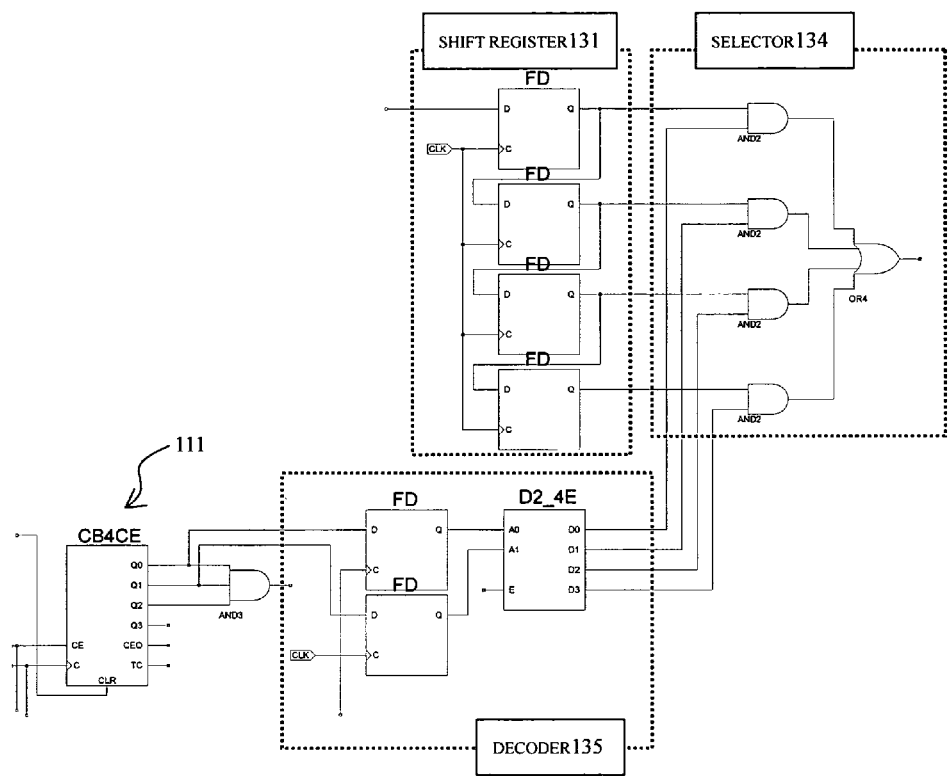
FIG. 11 is a schematic diagram showing a specific example of the counter 111, shift register 131, decoder 135 and selector 134 in the circuit configuration shown in FIG. 10.

FIG. 11 is a schematic diagram showing a specific example of the counter 111, shift register 131, decoder 135 and selector 134 in this circuit configuration.

Figure 12:
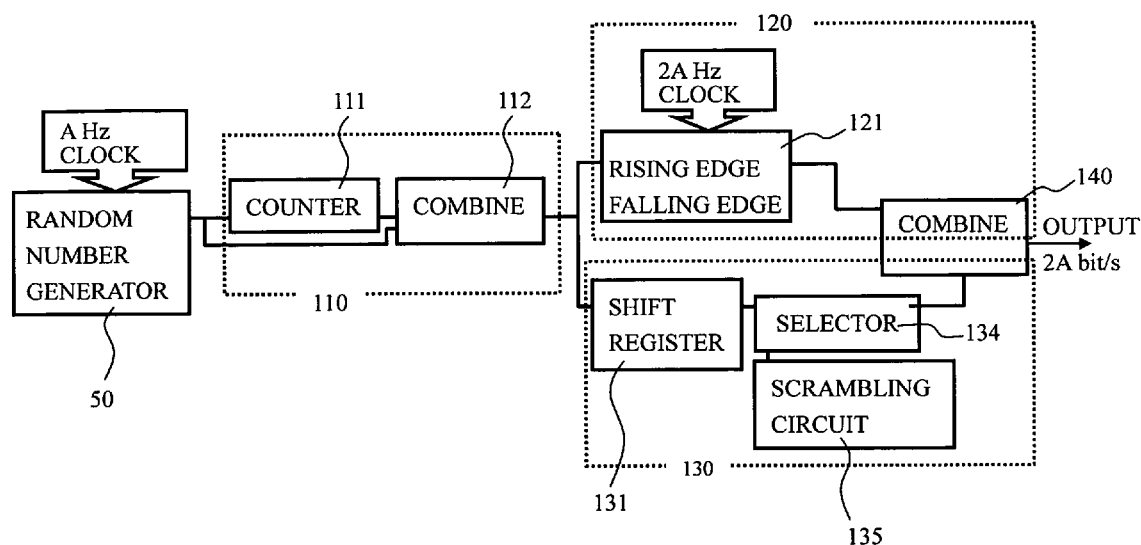
FIG. 12 is a block diagram showing a random number generating circuit in which a scrambling circuit is used in the smoothing unit 130.

FIG. 12 is a block diagram showing a random number generating circuit in which a scrambling circuit is used in the smoothing unit 130. More specifically, in this specific example, the scrambling circuit 133 is used to determine the number of clocks for the shift register 131. The scrambling circuit 133 may utilize, for example, an oscillating circuit (not shown).

Figure 13:
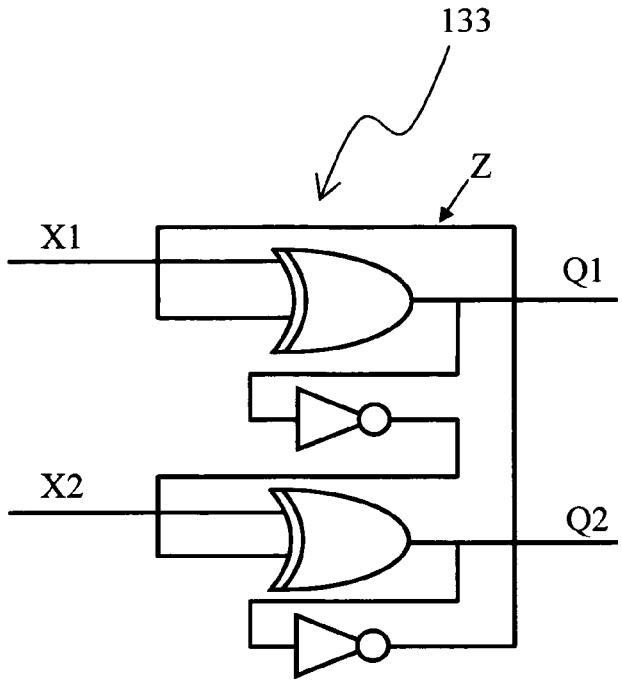
FIG. 13 is a schematic diagram showing a specific example of the scrambling circuit 133.

FIG. 13 is a schematic diagram showing a specific example of the scrambling circuit 133. More specifically, the scrambling circuit according to this specific example is an oscillating circuit of discontinuous oscillation type. For two inputs X1 and X2, it yields two outputs Q1 and Q2. When the two inputs X1 and X2 are equal, its operation is equivalent to that of a flip-flop comprising an even number of inverters. On the other hand, when the two inputs X1 and X2 are different, it is a ring oscillating circuit. Accordingly, when the two inputs X1 and X2 are equal or different half-and-half, it oscillates for half a duration of the circuit operating period.

Furthermore, the circuit shown in FIG. 13 produces an output that also depends on the initial value Z, as opposed to a simple oscillating circuit. More specifically, given the initial value Z of "1", when the inputs X1 and X2 are both "1", the outputs Q1 and Q2 are both "0". When the inputs X1 and X2 are both "0", the output Q1 is "1" and Q2 is "0".

On the other hand, given the initial value Z of "0", when the inputs X1 and X2 are both "1", the outputs Q1 and Q2 are both "1". When the inputs X1 and X2 are both "0", the output Q1 is "0" and Q2 is "1".

As described above, the scrambling circuit 133 in the specific example of FIG. 13 can be referred to as "intermittent oscillating circuit" in the sense that it oscillates only when its two inputs X1 and X2 are different. The continuous oscillating circuit has shortcomings in that its random number data tends to have persistent periodicity and that it consumes large electric current. The intermittent oscillating circuit is a circuit that improves these points.

Figure 14:
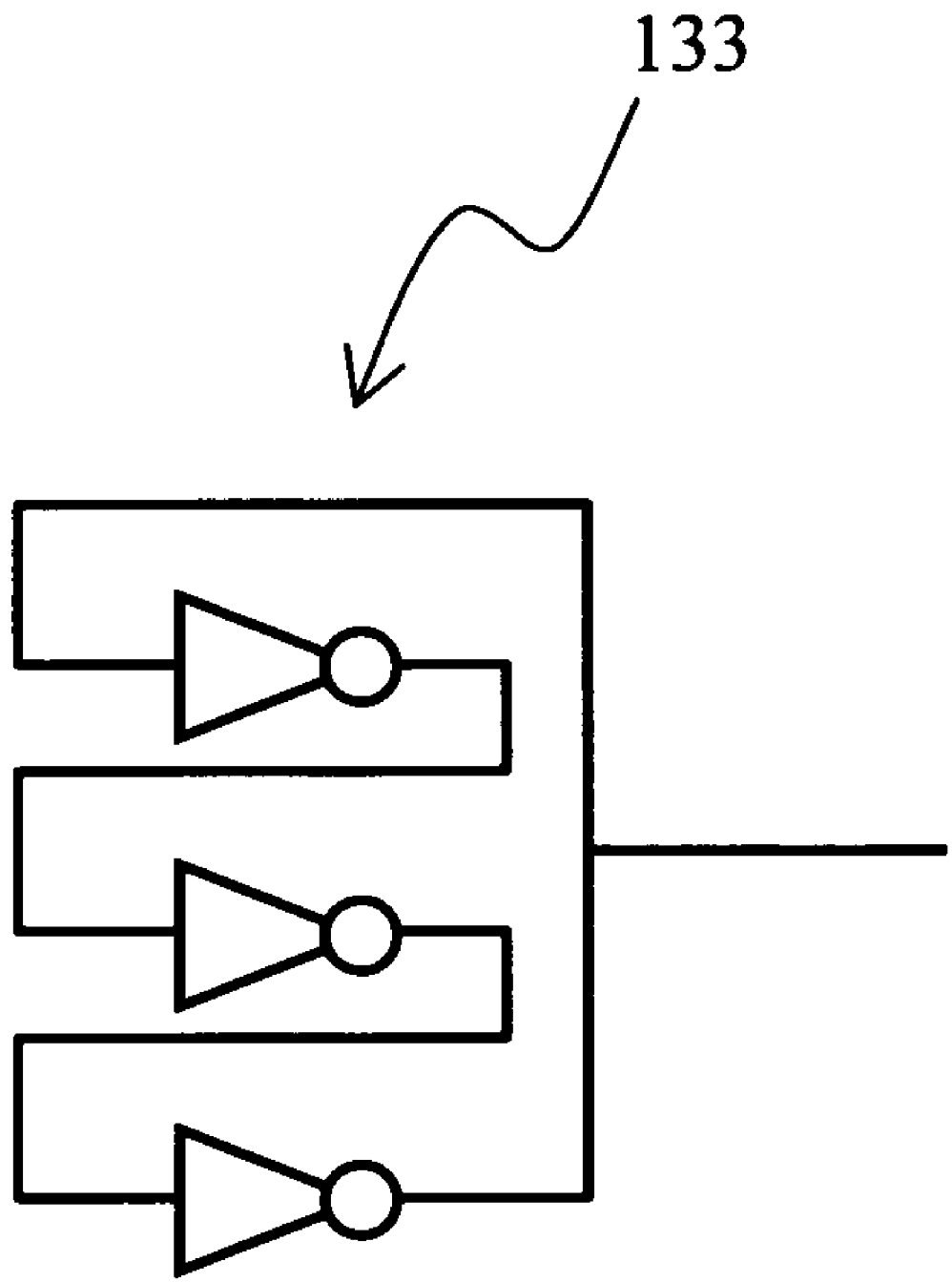
FIG. 14 is a schematic diagram showing another specific example of the scrambling circuit 133.

FIG. 14 is a schematic diagram showing another specific example of the scrambling circuit 133. More specifically, the scrambling circuit according to this specific example is a ring oscillator comprising three inverters connected in series, and can be referred to as "continuous oscillating circuit". In this case, it is desirable that the oscillating frequency is generally at least ten times as high as the system clock.

Accordingly, a number of these scrambling circuits 133 can be used to provide inputs to the selector 134 as shown in FIG. 12. One or more values of the shift register 131 can thus be selected and XORed to facilitate the smoothing. The random number generating circuit using the scrambling circuit 133 as described with reference to FIGS. 12 to 14 may have a larger circuit scale than that using the shift register 131.

However, the former has less degradation due to repeated speedups and is suitable to enhancing the rate while preserving its high quality.

Alternatively, if the emerging probabilities of "0" and "1" are balanced well in the output of the scrambling circuit 133, the output from the scrambling circuit 133 may be used for the smoothing as it is without using the shift register 131.

On the other hand, the pseudo-random output may be utilized for the smoothing. In this case, however, a problem that a periodicity of the pseudo-random number may be introduced into the random number sequence may arise, while the smoothing can be easily performed. Any one of these methods may be appropriately selected by considering the condition operated or specification required.

Figure 15:
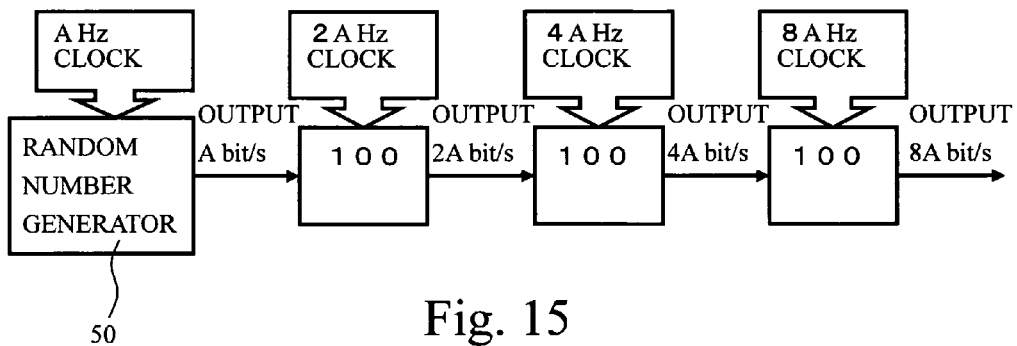
FIG. 15 is a block diagram showing a configuration in which the random number generating circuits according to the invention are connected in series, with their rates being successively twofold higher.

FIG. 15 is a block diagram showing a configuration in which the random number generating circuits according to the invention are connected in series, with their rates being successively twofold higher. According to the invention, the transformation in the random number generating circuit 100 can thus be repeated to accelerate the generating rate of the digital random number signal twofold for each iteration. As a result, even a digital random number signal with very high rates can be generated depending on applications.

Figure 16:
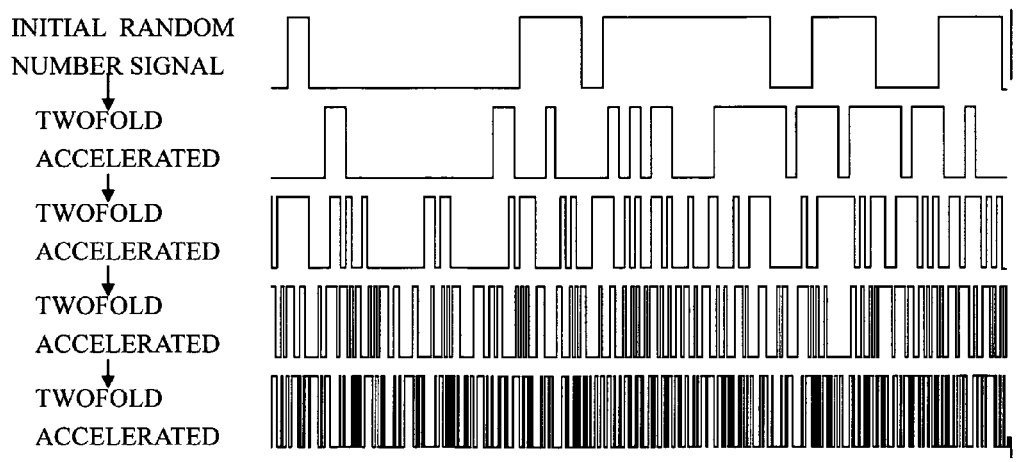
FIG. 16 is a schematic diagram showing the variation of waveforms when the circuit configuration shown in FIG. 2 is used to repeatedly transform the digital waveforms as shown in FIG. 15.

FIG. 16 is a schematic diagram showing the variation of waveforms when the circuit configuration shown in FIG. 2 is used to repeatedly transform the digital waveforms as shown in FIG. 15. As shown in the figure, repeated twofold speedups gradually reduces the interval of fluctuation of digital waveforms, which ensures randomness even when the signal is rapidly read out.

Table 1 shows a FIPS 140-2 test result for the physical random number sequence outputted at a rate of 9 kbits/s from the physical random number generator 50.

TABLE 1

(9 kbits/s)

|  | [row 0] | [row 1] | [row 2] | [row 3] | [row 4] | [row 5] | [row 6] | [row 7] |
|---|---|---|---|---|---|---|---|---|
| monobit | 10101 | 10126 | 10082 | 9933 | 10033 | 9948 | 9980 | 9934 |
| Poker test | 17.9968 | 17.9392 | 24.6592 | 13.3696 | 17.0752 | 16.6976 | 14.7712 | 13.5552 |
| Run test |  |  |  |  |  |  |  |  |
| '0' run count[1] | 2575 | 2536 | 2393 | 2465 | 2487 | 2496 | 2459 | 2479 |
| '0' run count[2] | 1281 | 1245 | 1300 | 1226 | 1271 | 1288 | 1246 | 1254 |
| '0' run count[3] | 609 | 582 | 628 | 606 | 646 | 579 | 645 | 657 |
| '0' run count[4] | 302 | 301 | 322 | 345 | 310 | 308 | 320 | 317 |
| '0' run count[5] | 135 | 143 | 137 | 165 | 137 | 163 | 157 | 169 |
| '0' run count[6] | 152 | 168 | 153 | 158 | 156 | 173 | 152 | 139 |
| '1' run count[1] | 2509 | 2428 | 2422 | 2467 | 2492 | 2526 | 2481 | 2501 |
| '1' run count[2] | 1285 | 1240 | 1191 | 1241 | 1237 | 1213 | 1242 | 1300 |
| '1' run count[3] | 650 | 652 | 670 | 619 | 646 | 657 | 626 | 615 |
| '1' run count[4] | 318 | 338 | 305 | 331 | 336 | 307 | 316 | 317 |
| '1' run count[5] | 134 | 163 | 168 | 166 | 150 | 156 | 151 | 145 |
| '1' run count[6] | 158 | 154 | 177 | 141 | 147 | 148 | 163 | 138 |
| Long run test |  |  |  |  |  |  |  |  |
| longest run of '0' | 11 | 14 | 12 | 13 | 10 | 13 | 15 | 13 |

TABLE 1-continued (9 kbits/s)

| | [row 0] | [row 1] | [row 2] | [row 3] | [row 4] | [row 5] | [row 6] | [row 7] |
|---|---|---|---|---|---|---|---|---|
| longest run of '1' | 13 | 13 | 12 | 12 | 12 | 11 | 13 | 14 |

Table 2 shows a FIPS 140-2 test result where this physical random number sequence is accelerated up to 1.152 Mbits/s through seven iterations of the transformation by the random number generating circuit shown in FIG. 2.

TABLE 2

(1.152 Mbits/s)

| | [row 0] | [row 1] | [row 2] | [row 3] | [row 4] | [row 5] | [row 6] | [row 7] |
|---|---|---|---|---|---|---|---|---|
| monobit | 10025 | 9942 | 9944 | 10134 | 10044 | 9915 | 9958 | 10052 |
| Poker test | 29.9648 | 34.0736 | 11.5264 | 27.8528 | 6.6688 | 16.2496 | 40.4672 | 10.688 |
| Run test | | | | | | | | |
| '0' run count[1] | 2566 | 2531 | 2460 | 2619 | 2501 | 2522 | 2606 | 2541 |
| '0' run count[2] | 1360 | 1350 | 1263 | 1287 | 1321 | 1249 | 1368 | 1201 |
| '0' run count[3] | 640 | 622 | 618 | 641 | 589 | 670 | 598 | 637 |
| '0' run count[4] | 342 | 361 | 310 | 300 | 329 | 314 | 296 | 323 |
| '0' run count[5] | 150 | 137 | 180 | 154 | 148 | 185 | 158 | 146 |
| '0' run count[6] | 97 | 125 | 156 | 115 | 145 | 130 | 141 | 156 |
| '1' run count[1] | 2591 | 2607 | 2529 | 2506 | 2531 | 2546 | 2573 | 2471 |
| '1' run count[2] | 1323 | 1282 | 1246 | 1327 | 1218 | 1287 | 1343 | 1302 |
| '1' run count[3] | 645 | 659 | 622 | 668 | 644 | 657 | 716 | 616 |
| '1' run count[4] | 337 | 299 | 284 | 336 | 320 | 307 | 308 | 293 |
| '1' run count[5] | 141 | 161 | 136 | 145 | 172 | 142 | 123 | 163 |
| '1' run count[6] | 119 | 118 | 170 | 135 | 148 | 130 | 104 | 160 |
| Long run test | | | | | | | | |
| longest run of '0' | 10 | 10 | 13 | 12 | 11 | 12 | 11 | 11 |
| longest run of '1' | 10 | 11 | 12 | 11 | 10 | 11 | 10 | 15 |

It can be seen in Table 1 that at 9 kbits/s, the sequence has passed all the tests without any problems. When it is accelerated up to 1.152 Mbits/s, it has generally reached a level of passing the test. Consequently, according to the criterion of the FIPS 140-2 test, acceleration by at least two orders of magnitude is available.

As described above, the present circuit can be used to enhance the generating rate of random numbers by several orders of magnitude on a certain criterion which is established with respect to the quality of the random numbers. As a result, a digital random number signal of a predetermined quality can be generated at higher rates than before.

Next, a semiconductor integrated circuit (IC) comprising the random number generating circuit according to the invention will be described.

Figure 17:
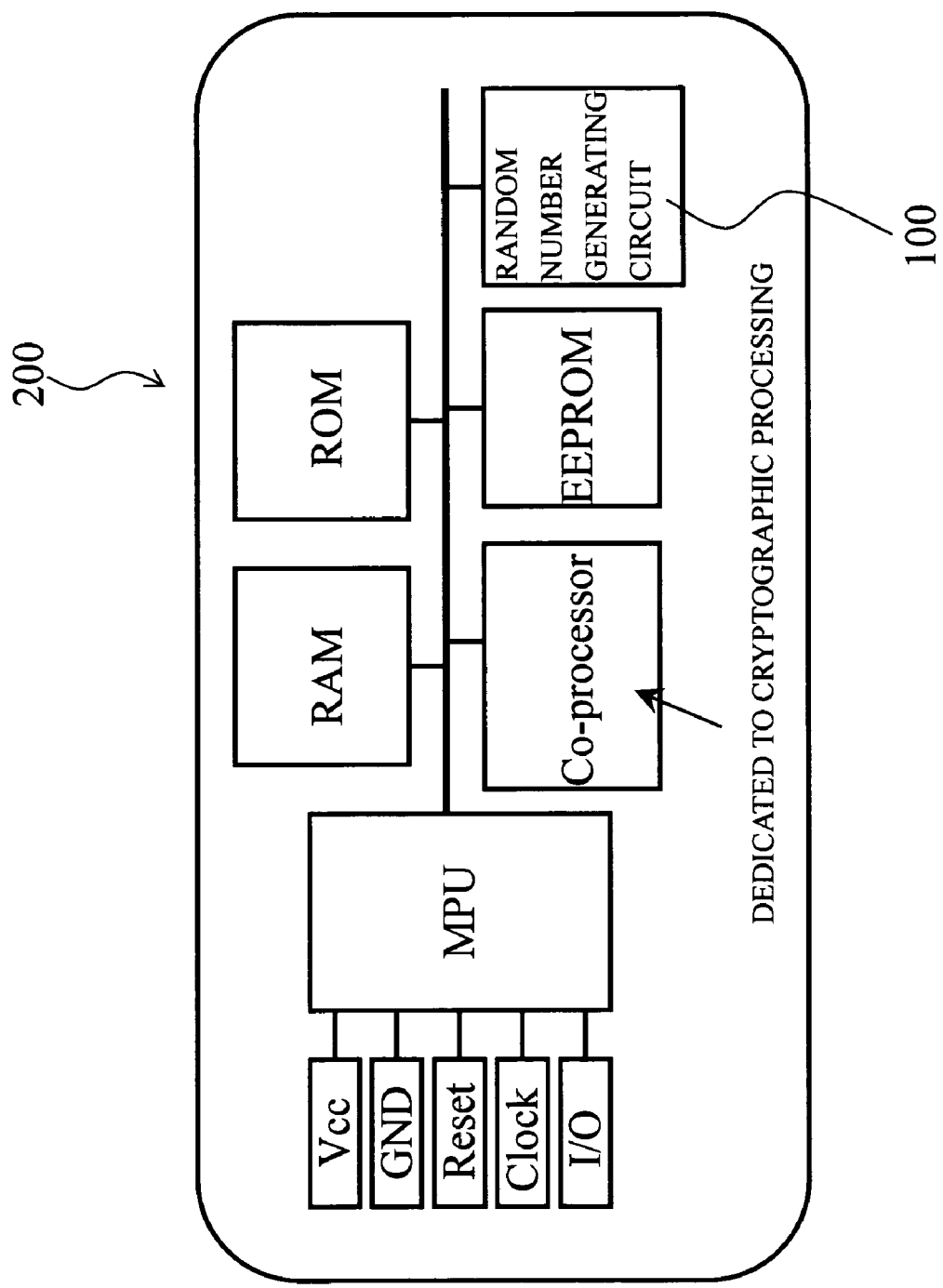
FIG. 17 is a schematic diagram showing a configuration of a relevant part of the semiconductor integrated circuit according to the specific example of the invention.

FIG. 17 is a schematic diagram showing a configuration of a relevant part of the semiconductor integrated circuit according to this specific example. This specific example is an IC that can be mounted on an IC card, for example. The IC comprises an operating unit (MPU), memory (RAM, ROM, EEPROM), auxiliary operating unit (co-processor), and random number generating circuit 100. Here, the auxiliary operating unit (co-processor) serves to perform cryptographic processing.

The random number generating circuit 100 also includes the random number generator 50 as illustrated in FIGS. 1 to 16. The random number generating circuit 100 can generate a high-quality digital random number signal at high rates by combining the continuous signal processing unit 110, high-rate signal introducing unit 120 and smoothing unit 130 as described above. With the random number generating circuit 100 on board, the operating unit (MPU) and the auxiliary operating unit (co-processor) dedicated to cryptographic processing can always read out and use high-quality random numbers at high rates. The random numbers can also be used for disturbing the variation of electric current consumption as a countermeasure against hacking techniques for reading out the encryption key from the signal of electric current consumption of the IC. This can achieve a high level of cryptographic security.

Figure 18:
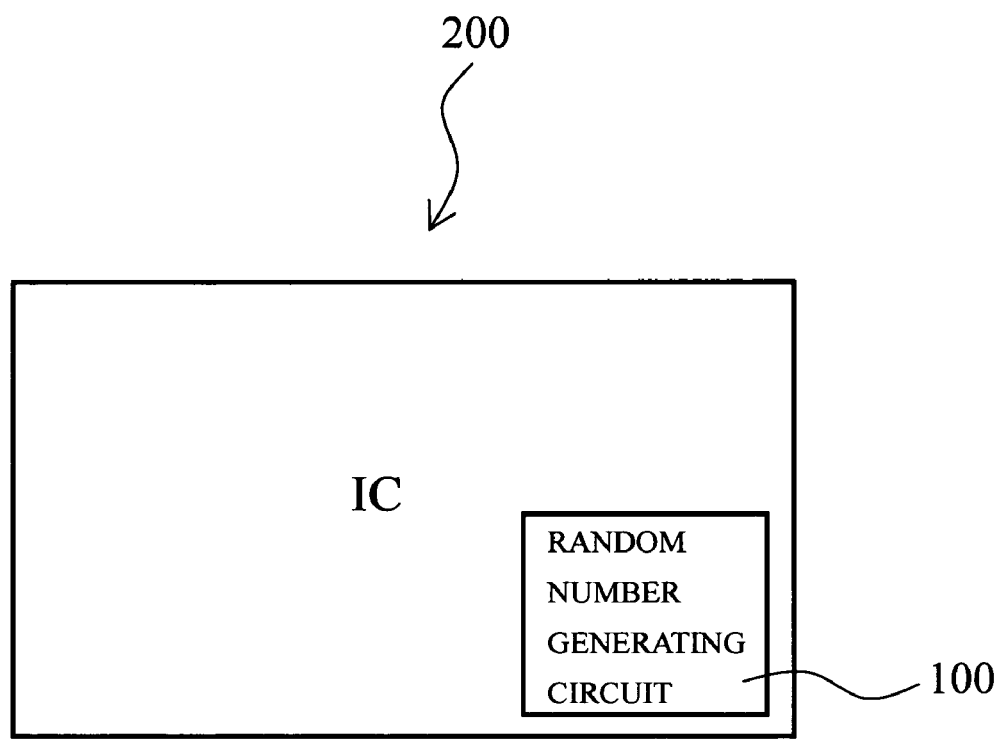
FIG. 18 is a conceptual diagram for illustrating the circuit scale of the semiconductor integrated circuit 200 according to the specific example of the invention.

FIG. 18 is a conceptual diagram for illustrating the circuit scale of the semiconductor integrated circuit 200 according to this specific example. More specifically, the random number generating circuit 100 according to the invention can be entirely configured from CMOS logic circuits alone. Furthermore, it can be mounted on various ICs because the number of logic gates required is as low as several hundreds. The circuit scale is on the order of or smaller than that illustrated in FIG. 18, and free from any problems of significantly increasing the entire size of the IC.

With the random number generating circuit according to the invention on board, sophisticated cryptographic security capabilities are made available. It can also be used for random numbers in gaming machines and Monte Carlo simulations.

Next, an IC card and portable information terminal device on which the random number generating circuit according to the invention is mounted will be described.

Figure 19:
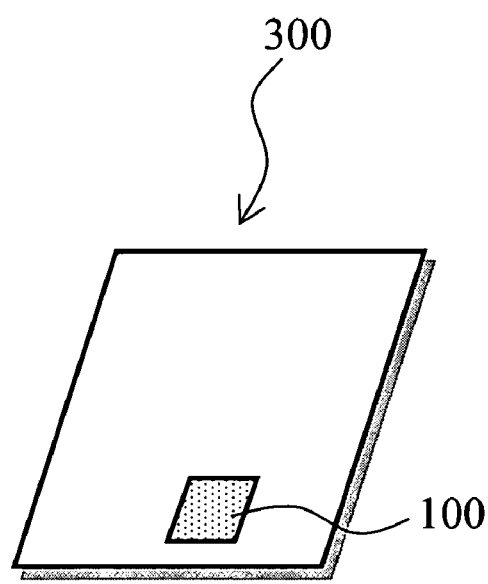
FIG. 19 is a schematic diagram showing an IC card and information terminal device according to the specific example of the invention.

FIG. 19 is a schematic diagram showing an IC card and information terminal device according to this specific example. More specifically, in the figure, reference numeral 300 designates an IC card or information terminal device according to this specific example. The IC card may include, for example, a bank deposit card or various other prepaid cards, a company employee ID card and an access security card. The information terminal device may include, for example, a cellular phone or other portable terminals. The portable terminal may be provided with one or more capabilities including, for example, word processor, spreadsheet, scheduler, game, transmitting and receiving emails, and taking still or moving pictures.

Figure 20:
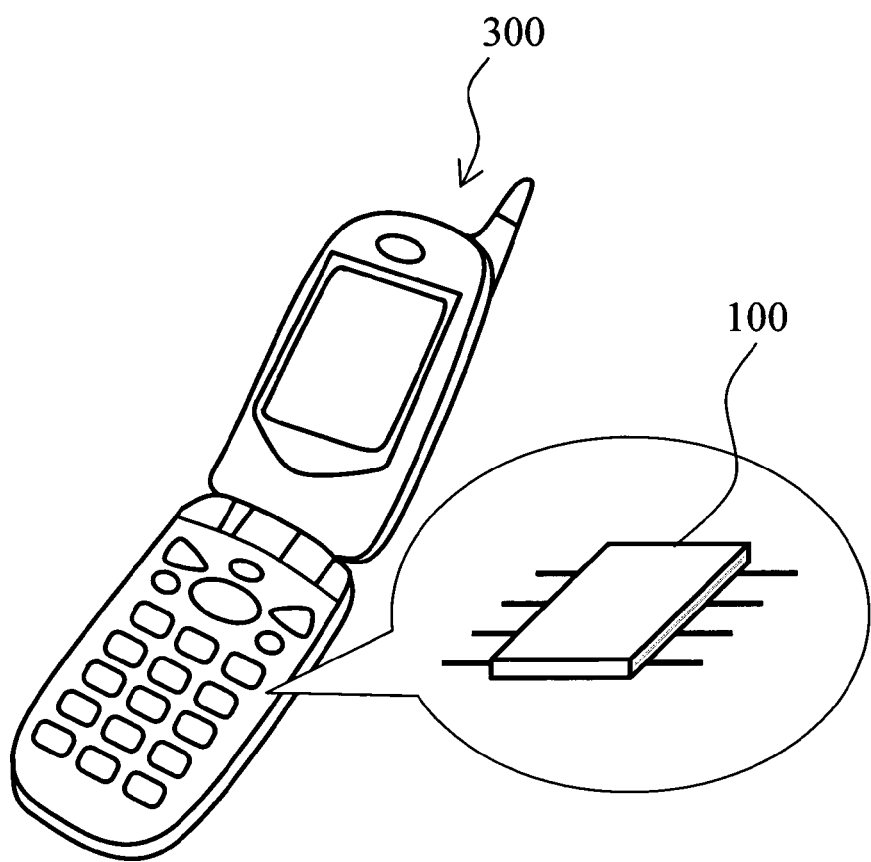
FIG. 20 is a schematic diagram showing a cellular phone as a specific example of the invention.

For example, a cellular phone 300 as shown in FIG. 20 can be equipped with the random number generating circuit 100 according to the invention. It is also the case for similar portable information terminals.

Furthermore, according to the invention, a high-quality digital random number signal can be generated at high rates by combining the continuous signal processing unit 110, high-rate signal introducing unit 120 and smoothing unit 130 as described above. As a result, a high level of cryptographic security capability can be added while greatly reducing the size and suppressing power consumption. In other words, the random number generating circuit 100 can be used, for example, for user authentication process, encryption and decryption of treated data, as well as game features and random numbers for Monte Carlo simulations.

As described above, the invention can achieve a random number generating circuit capable of generating highly genuine random numbers at high rates with a compact size, low power consumption and low cost. As a result, it can be applied to, for example, an IC card or information terminal device, to achieve a secure and inexpensive system, thus contributing much to industrial fields.

Embodiments of the invention have been described with reference to specific examples. However, the invention is not limited to the specific examples described above.

For example, the specific configuration of the random number generator, continuous signal processing unit, high-rate signal introducing unit and smoothing unit used in the invention is not limited to the above-described specific examples. Instead, any variation that includes circuit replacements having similar operations or functions is to be encompassed within the scope of the invention.

For example, a logic circuit comprising a plurality of flip-flops having an indeterminate output connected in parallel or in series can also be used for the random number generator.

The flip-flop used in the invention is not limited to the D-type flip-flop illustrated in the specific example. Instead, various other types of flip-flops can be used.

While digital random numbers generated by the random number generating circuit according to the invention may be used directly, they may also be used as a seed for another arithmetic random number generating circuit to generate new random numbers.

What is claimed is:

1. A random number generating circuit, comprising:
   an input that receives a first digital random number signal generated at a first generating rate;
   a continuous signal processing unit to process the first digital random number signal so that any of its high and low levels do not repeat more than or equal to a predetermined number of times;
   a high-rate signal introducing unit to introduce a signal component corresponding to a second generating rate that is twice as high as the first generating rate into the first digital random number signal;
   a smoothing unit to control a frequency of occurrence for the high and low levels in a data sequence of the second digital random number signal; and
   an output to thereby output a second digital random number having the second generating rate.

2. The random number generating circuit according to claim 1, wherein the continuous signal processing unit includes: a counter to count the number of continued repetitions of any of the high and low levels; and a first combining unit to output a level different from the repeated level when the number of continued repetitions measured by the counter exceeds a predetermined value.

3. The random number generating circuit according to claim 2, wherein the smoothing unit includes: a shift register to shift the first digital random number signal; a decoder to decode an output of the counter; a selector to select the number of shifts in the shift register based on an output of the decoder; and a second combining unit to combine the first digital random number signal shifted by the shift register and the first digital random number signal not shifted by the shift register.

4. The random number generating circuit according to claim 1, wherein the continuous signal processing unit includes: a pulse generating unit to output a pulse signal at a fixed interval; and a first combining unit to combine the first digital random number signal inputted and the pulse signal for output.

5. The random number generating circuit according to claim 1, wherein the high-rate signal introducing unit introduces the signal component corresponding to the second generating rate by detecting a rising and falling edge of the levels in the first digital random number signal generated at the first generating rate.

6. The random number generating circuit according to claim 1, wherein the smoothing unit includes: a shift register to shift the first digital random number signal; and a second combining unit to combine the first digital random number signal shifted by the shift register and the first digital random number signal not shifted by the shift register.

7. The random number generating circuit according to claim 1, wherein the second combining unit outputs an exclusive-OR between the first digital random number signal shifted by the shift register and the first digital random number signal not shifted by the shift register.

8. A semiconductor integrated circuit, comprising:
a random number generating circuit that receives as an input a first digital random number signal generated at a first generating rate,
wherein the random number generating circuit includes:
a continuous signal processing unit to process the first digital random number signal so that any of its high and low levels do not repeat more than or equal to a predetermined number of times;
a high-rate signal introducing unit to introduce a signal component corresponding to a second generating rate that is twice as high as the first generating rate into the first digital random number signal;
a smoothing unit to control a frequency of occurrence for the high and low levels in a data sequence of the second digital random number signal; and
an output to thereby output a second digital random number having the second generating rate.

9. The semiconductor integrated circuit according to claim 8, wherein the continuous signal processing unit includes: a counter to count the number of continued repetitions of any of the high and low levels; and a first combining unit to output a level different from the repeated level when the number of continued repetitions measured by the counter exceeds a predetermined value.

10. The semiconductor integrated circuit according to claim 8, wherein the high-rate signal introducing unit introduces the signal component corresponding to the second generating rate by detecting a rising and falling edge of the levels in the first digital random number signal generated at the first generating rate.

11. An IC card, comprising:
a semiconductor integrated circuit including a random number generating circuit that receives as an input a first digital random number signal generated at a first generating rate,
wherein the random number generating circuit includes:
a continuous signal processing unit to process the first digital random number signal so that any of its high and low levels do not repeat more than or equal to a predetermined number of times;
a high-rate signal introducing unit to introduce a signal component corresponding to a second generating rate that is twice as high as the first generating rate into the first digital random number signal;
a smoothing unit to control a frequency of occurrence for the high and low levels in a data sequence of the second digital random number signal; and
an output to thereby output a second digital random number having the second generating rate.

12. The IC card according to claim 11, wherein the continuous signal processing unit includes:
a counter to count the number of continued repetitions of any of the high and low levels; and
a first combining unit to output a level different from the repeated level when the number of continued repetitions measured by the counter exceeds a predetermined value.

13. The IC card according to claim 11, wherein the high-rate signal introducing unit introduces the signal component corresponding to the second generating rate by detecting a rising and falling edge of the levels in the first digital random number signal generated at the first generating rate.

14. An information terminal device, comprising:
a semiconductor integrated circuit including a random number generating circuit that receives as an input a first digital random number signal generated at a first generating rate,
wherein the random number generating circuit includes:
a continuous signal processing unit to process the first digital random number signal so that any of its high and low levels do not repeat more than or equal to a predetermined number of times;
a high-rate signal introducing unit to introduce a signal component corresponding to a second generating rate that is twice as high as the first generating rate into the first digital random number signal;
a smoothing unit to control a frequency of occurrence for the high and low levels in a data sequence of the second digital random number signal; and
an output to thereby output a second digital random number having the second generating rate.

15. The information terminal device according to claim 14, wherein the continuous signal processing unit includes: a counter to count the number of continued repetitions of any of the high and low levels; and a first combining unit to output a level different from the repeated level when the number of continued repetitions measured by the counter exceeds a predetermined value.

16. The information terminal device according to claim 14, wherein the high-rate signal introducing unit introduces the signal component corresponding to the second generating rate by detecting a rising and falling edge of the levels in the first digital random number signal generated at the first generating rate.

* * * * *